United States Patent Office 3,444,199
Patented May 13, 1969

---

3,444,199
AMINO SUBSTITUTED TRICYCLO [3.2.2.0²,⁴]
NONANES
Joel G. Whitney, Claymont, Del., assignor to E. I. du Pont de Nemours and Company, Wilmington, Del., a corporation of Delaware
No Drawing. Filed Mar. 29, 1966, Ser. No. 538,232
Int. Cl. C07c 87/40, 17/00
U.S. Cl. 260—563                7 Claims

---

ABSTRACT OF THE DISCLOSURE

Tricyclo[3.2.2.0²,⁴]nonanes of the formula

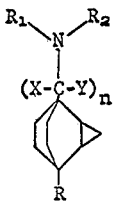

where $n$ is 0 or 1; X and Y are hydrogen, methyl or ethyl, and are the same or different; R is hydrogen or alkyl of 1 to 4 carbon atoms; $R_1$ and $R_2$ are hydrogen, alkyl of 1 to 4 carbon atoms, or allyl, and are the same or different, and non-toxic acid addition salts thereof are useful for inhibiting and deterring the incidence and growth of harmful viruses.

---

This invention relates to substituted tricyclo[3.2.2.0²,⁴]nonanes. More particularly this invention refers to novel tricyclo[3.2.2.0²,⁴]nonanes having an amino or substituted amino group attached directly or through a methylene group to a tertiary or bridgehead nuclear carbon.

The need continues for effective antiviral agents useful for the treatment of virus infections. I have now discovered a novel class of 1-aminotricyclo[3.2.2.0²,⁴]nonanes and tricyclo[3.2.2.0²,⁴]nonane-1-methylamines which show outstanding properties in their ability to inhibit and deter incidence and growth of harmful viruses.

Within the class of compounds of this invention, a wide range of activity has been observed in standard antiviral tests. In vivo tests in mice have indicated activity against such virus strains as influenza A (strains swine and equine 2), influenza A-1/FM-1, influenza A-2 (strains AA and Bethesda).

Therapeutic as well as prophylactic activity has been demonstrated against influenza A-2/AA in mouse tests.

The compounds of this invention have the formula:

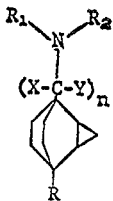

where $n$ is 0 or 1;
X and Y are hydrogen, methyl or ethyl, and are the same or different;
R is hydrogen or alkyl of 1 to 4 carbon atoms;

$R_1$ and $R_2$ are hydrogen, alkyl of 1 to 4 carbon atoms, or allyl, and are the same or different.

The compounds of the above formula, which contain a basic amine group, form salts with non-toxic acids and such salts are included within the scope of this invention. Examples of such salts are the hydrochloride, hydrobromide, sulfate, phosphate, acetate, lactate, succinate, propionate, pamoate, tartrate, acetylsalicylate, citrate cyclohexylsulfamate and the salts with caprochlorone and penicillin. Of these the hydrochloride and acetate are preferred.

Mixtures of compounds are contemplated to fall within the scope of this invention whether obtained as such in synthesis or admixed after preparation.

Included within the scope of this invention are compounds which are hydrolyzed in the animal body to the tricyclo[3.2.2.0²,⁴]nonaneamines included within the scope of the present invention.

From the above description it can be seen that the present invention broadly embodies tricyclo[3.2.2.0²,⁴]nonaneamines and their use as antiviral agents.

Listed below are the amines which are the preferred compounds of this invention.

1-amino-5-methyltricyclo[3.2.2.0²,⁴]nonane
α,5-dimethyltricyclo[3.2.2.0²,⁴]nonane-1-methylamine
α,α,5-trimethyltricyclo[3.2.2.0²,⁴]nonane-1-methylamine
1-(N-methylamino)-5-methyltricyclo[3.2.2.0²,⁴]nonane
1-(N,N-dimethylamino)-5-methyltricyclo[3.2.2.0²,⁴]
  nonane
α-methyltricyclo[3.2.2.0²,⁴]nonane-1-methylamine
α,α-dimethylaminotricyclo[3.2.2.0²,⁴]nonane-1-
  methylamine
1-(N-ethylamino)-5-methyltricyclo[3.2.2.0²,⁴]nonane
1-amino-5-ethyltricyclo[3.2.2.0²,⁴]nonane
α-methyl-5-ethyltricyclo[3.2.2.0²,⁴]nonane-1-methylamine
α,α-dimethyl-5-ethyltricyclo[3.2.2.0²,⁴]nonane-1-
  methylamine
α,N,5-trimethyltricyclo[3.2.2.0²,⁴]nonane-1-methylamine
α,N-dimethyltricyclo[3.2.2.0²,⁴]nonane-1-methylamine
5-methyltricyclo[3.2.2.0²,⁴]nonane-1-methylamine
1-(N-methylamino)-5-ethyltricyclo[3.2.2.0²,⁴]nonane
α,N,N,5-tetramethyltricyclo[3.2.2.0²,⁴]nonane-1-
  methylamine
tricyclo[3.2.2.0²,⁴]nonane-1-methylamine The above compounds can be prepared by a variety of methods.

Preparation of 1-aminotricyclo[3.2.2.0²,⁴]nonanes and tricyclo[3.2.2.0²,⁴]nonane-1-methylamines 4 - alkylbicyclo[2.2.2]oct-2-ene-1-carboxylic acid alkyl esters can be prepared by the reaction of ethylene with the appropriate 6-alkyl-α-pyrone-3-carboxylic acid alkyl ester as described in copending application SN 375,337, now abandoned.

The 4 - alkylbicyclo[2.2.2]oct - 2 - ene - 1 - carboxylic acid alkyl esters may be converted to 5-alkyltricyclo [3.2.2.0²,⁴]nonane-1-carboxylic acid alkyl esters via the Simmons-Smith reaction using methylene iodide and a zinc-copper couple. Hydrolysis with alkali gives the 5-alkyl-tricyclo[3.2.2.0²,⁴]nonane-1-carboxylic acids.

These versatile intermediates may either be converted to a 1-amino-5-alkyltricyclo[3.2.2.0²,⁴]nonane by a modified Curtius reaction or to a 5-alkyltricyclo[3.2.2.0²,⁴] nonane-1-carboxylic acid mixed anhydride with an alkyl chloroformate, and then to a 5-alkyltricyclo[3.2.2.0²,⁴]

nonane-1carboxamide by reaction with ammonia. Alternatively, the 5-alkyltricyclo[3.2.2.0$^{2,4}$]nonane-1-carboxylic acids may be converted to the 5-alkyltricyclo[3.2.2.0$^{2,4}$]nonane-1-carboxylic acid chlorides with thionyl chloride, and then to the corresponding carboxamides by reaction with ammonia.

The amides can be reduced with lithium aluminum hydride to give 5-alkyltricyclo[3.2.2.0$^{2,4}$]nonane-1-methylamines. By starting with alkyl esters of 4-methylbicyclo[2.2.2]oct-2-ene-1-carboxylic acid in this sequence, 1-amino-5-methyltricyclo[3.2.2.0$^{2,4}$]nonane and 5-methyltricyclo[3.2.2.0$^{2,4}$]nonane-1-methylamine are easily prepared.

The α - alkyltricyclo[3.2.2.0$^{2,4}$]nonane-1-methylamines are prepared by reduction of tricyclo[3.2.2.0$^{2,4}$]nonane-(1) alkyl ketone oximes with sodium and alcohol. The ketones from which these oximes are derived can be conveniently made by the reaction of the appropriate dialkyl cadmium with a tricyclo[3.2.2.0$^{2,4}$]nonane-1-carboxylic acid chloride. Alternatively, methyl ketones may be prepared by the reaction of tricyclo[3.2.2.0$^{2,4}$]nonane-1-carboxylic acids with methyl lithium.

The α,α-dialkylatedtricyclo[3.2.2.0$^{2,4}$]nonane-1-methylamines can be made by the reaction of O-methylhydroxylamine with the corresponding α,α - dialkyltricyclo[3.2.2.0$^{2,4}$]nonane-1-methyl magnesium chloride. The Grignards for this reaction are prepared by the reaction of magnesium with α,α-dialkyltricyclo[3.2.2.0$^{2,4}$]nonane-1-methyl chlorides, which are obtained from the reaction of thionyl chloride on the corresponding tertiary alcohols.

The α,α - dialkyltricyclo[3.2.2.0$^{2,4}$]nonane-1-methanols are produced by the reaction of the appropriate tricyclo[3.2.2.0$^{2,4}$]nonane-1-carboxylic acid chlorides with alkyl Grignard reagents. Reaction of a tricyclo[3.2.2.0$^{2,4}$]nonane-(1) alkyl ketone with a Grignard reagent can be used to synthesize an α,α-dialkyltricyclo[3.2.2.0$^{2,4}$]nonane-1-methanol, where the two alkyl groups are different.

One or both of the hydrogens of the 1-aminotricyclo[3.2.2.0$^{2,4}$]nonanes and tricyclo[3.2.2.0$^{2,4}$]nonane-1-methylamines can be replaced by alkyl groups.

This is most conveniently done by acylation followed by reduction. The primary amine is acylated with an acid chloride, acid anhydride or ester to yield the N-acyl compound which is reduced with lithium aluminum hydride to give the N-alkyl compound. The N-alkylamines may be acylated again and reduced to produce N,N-dialkylamines. Different alkyl groups may be attached by this means. Dialkylamines having identical alkyl groups are prepared by employing the same acylating agent for the first and second acylations. For example, acylation of 1-aminotricyclo[3.2.2.0$^{2,4}$]nonane with acetyl chloride followed by reduction gives 1-(N-ethylamino)tricyclo[3.2.2.0$^{2,4}$]nonane. Reaction of this product with propionyl chloride and reduction gives 1-N-ethyl-(N-propylamino)tricyclo[3.2.2.0$^{2,4}$]nonane. If acetylchloride is used for the second acylation, 1-(N,N-diethylamino)tricyclo[3.2.2.0$^{2,4}$]nonane will result, where the alkyl groups are identical.

N,N-dimethylamines can be prepared by acylation of the N-methylamines with butylformate followed by reduction of the formamide with lithium aluminum hydride. An easier preparation of N,N-dimethylamines uses the Eschweiler-Clarke reaction of formic acid, formaldehyde and a primary amine. In fact, where one of the alkyl groups of an N,N-dialkylamine is methyl, it is easiest to introduce the non-methyl alkyl group by acylation and reduction and then to treat this with formic acid and formaldehyde to obtain the N-alkyl-N-methylamine.

N-alkyl and N-allyl groups can be introduced by direct alkylation of the amine derivatives of tricyclo[3.2.2.0$^{2,4}$]nonane, using an alkyl or allyl halide and an acid acceptor. When equimolar quantities of the primary amine and halide are used the major product is the N-alkyl or N-allylamine, but usually some of the N,N-dialkyl- and N,N-diallylamine is formed as a by-product. The two are usually separated by distillation. The reaction of a primary amine with excess halide usually leads to dialkylation or diallylation.

If an N,N-dialkylamine (with two different alkyl groups) or N-alkyl-N-allylamine is desired, one starts with an N-alkylamine and introduces the second alkyl or allyl group by using an equimolar amount of the corresponding halide. With secondary amines the use of excess halide leads to quaternization and a decreased yield of the desired product.

This method is less preferred than the method of acylation and reduction. However, sometimes the less preferred method becomes the method of choice because it involves fewer steps.

While the N-alkylated derivatives of 5-alkyltricyclo[3.2.2.0$^{2,4}$]nonane-1-methylamines may be prepared by acylation and reduction or by alkylation with alkyl halides, the best and simplest method is to prepare the appropriate 5-alkyltricyclo[3.2.2.0$^{2,4}$]nonane - 1 - carboxamide by reaction of the 5 - alkyltricyclo[3.2.2.0$^{2,4}$]nonane-1-carboxylic acid chloride or 5-alkyltricyclo[3.2.2.0$^{2,4}$]nonane-1-carboxylic acid mixed anhydride with the properly substituted amine and reduce it to the desired N-alkylated or N,N-dialkylated compound. For example, reaction of tricyclo[3.2.2.0$^{2,4}$]nonane-1-carboxylic acid chloride with methylamine gives N-methyltricyclo[3.2.2.0$^{2,4}$]nonane-1-carboxamide which on reduction affords N-methyltricyclo[3.2.2.0$^{2,4}$]nonane-1-methylamine. N - ethyl-N-methyltricyclo[3.2.2.0$^{2,4}$]nonane-1-carboxamide on reduction yields N-ethyl - N - methyltricyclo[3.2.2.0$^{2,4}$]nonane-1-methylamine.

Salts of the amines of this invention are prepared in a number of ways. Generally, the amine is contacted with the acid in water or in an organic solvent. In some instances, the salt is insoluble and is collected by filtration and dried. For example, most of the hydrochlorides of the amines of this invention are insoluble in ether. Solvents such as alcohol and water, in which the amine salts are generally soluble, can be used just as well. After the amine and the acid have been combined, the solvent is removed by evaporation.

Because the solubility of the salt in water depends to an extent on the acid anion, many salts are in fact insoluble in water and alcohols. Pamoates, for example, are usually quite water insoluble and separate from aqueous mixtures almost quantitatively.

Representative of the compounds of this invention are the following, as well as their non-toxic salts.

1-amino-5-methyltricyclo[3.2.2.0$^{2,4}$]nonane
α-5-dimethyltricyclo[3.2.2.0$^{2,4}$]nonane-1-methylamine
5-methyltricyclo[3.2.2.0$^{2,4}$]nonane-1-methylamine
α,α,5-trimethyltricyclo[3.2.2.0$^{2,4}$]nonane-1-methylamine
1-(N-ethylamino)-5-methyltricyclo[3.2.2.0$^{2,4}$]nonane
1-(N,N-dimethylamino)-5-methyltricyclo[3.2.2.0$^{2,4}$]nonane
1-(N-ethyl-N-methylamino)-5-methyltricyclo[3.2.2.0$^{2,4}$]nonane
N-ethyl-N-propyl-5-methyltricyclo[3.2.2.0$^{2,4}$]nonane-1-methylamine
N-allyl-α,5-dimethyltricyclo[3.2.2.0$^{2,4}$]nonane-1-methylamine
N,N-diallyl-α,5-dimethyltricyclo[3.2.2.0$^{2,4}$]nonane-1-methylamine
1-(N-allyl-N-ethylamino)-5-methyltricyclo[3.2.2.0$^{2,4}$]nonane
α-ethyltricyclo[3.2.2.0$^{2,4}$]nonane-1-methylamine
α-ethyl-α-methyltricyclo[3.2.2.0$^{2,4}$]nonane-1-methylamine

EXAMPLE 1

1-amino-5-methyltricyclo[3.2.2.0$^{2,4}$]nonane hydrochloride

A mixture of 6.75 g. of Zn-Cu couple [J. Org. Chem., 24, 1825 (1959)], 0.318 g. (1.5 mmoles) of iodine, 5 ml.

(16.5 g., 61.6 mmoles) of methylene iodide and 15 ml. of ether was heated at reflux with stirring for 30 minutes. Then with heating and stirring continued, there was added 6.0 g. (30.9 mmoles) of ethyl 4-methylbicyclo-[2.2.2]oct-2-ene-1-carboxylate dropwise over 15 minutes. The reaction mixture was then heated at reflux with stirring for 48 hours, cooled and insoluble materials were removed by filtration, washing well with ether. The combined ether filtrates were washed with 5% aqueous hydrochloric acid, 5% aqueous sodium bicarbonate, water and then a saturated aqueous sodium chloride solution. The ether was dried over magnesium sulfate and then concentrated in vacuo to yield 3.90 g. of ethyl 5-methyltricyclo[3.2.2.0$^{2,4}$]nonane-1-carboxylate as a yellow oil.

The ester was refluxed with 150 ml. (200 mmoles) of 2 N aqueous sodium hydroxide overnight. The reaction solution was cooled and the product precipitated by acidification with concentrated hydrochloric acid. The product was collected by filtration and washed free of chloride ion with water. After drying under high vacuum there was obtained 3.0 g. (54%) of 5-methyltricyclo-[3.2.2.0$^{2,4}$]nonane-1-carboxylic acid as a colorless solid. An analytical sample was prepared by one recrystallization from nitromethane, M.P. 160–2°.

*Analysis*—Calcd. for $C_{11}H_{16}O_2$: C, 73.4; H, 8.88. Found: C, 73.4; H, 8.87.

The NMR spectrum has peaks for cyclopropyl hydrogens. $\lambda^{Nujol} = 1700$ cm.$^{-1}$.

To a solution of 3.0 g. (16.7 mmoles) of 5-methyltricyclo[3.2.2.0$^{2,4}$]nonane-1-carboxylic acid in 18 ml. of acetone at 0° was added 2.57 ml. (1.86 g., 18.4 mmoles) of triethylamine dropwise with stirring. Then a solution of 2.0 g. (18.4 mmoles) of ethyl chloroformate in 4 ml. of acetone was added dropwise at 0° and the reaction mixture was stirred at 0° C. for 30 minutes. A solution of 2.3 g. (34.1 mmoles) of sodium azide in 6.5 ml. of water was then added dropwise at 0° C. and the reaction mixture was stirred at 0° C. for an additional 30 minutes. The reaction mixture was poured onto 65 ml. of ice water and the acid azide was extracted into toluene. The combined toluene extracts were dried over magnesium sulfate, heated gently on the steam bath until nitrogen evolution ceased and then were heated for an additional 30 minutes. Concentration of the toluene solution in vacuo afforded 2.77 g. (100%) of the oily 5-methyltricyclo[3.2.2.0$^{2,4}$]nonane-1-isocyanate.

A solution of 0.1 mole of the isocyanate in 300 ml. of methanol containing 0.5 g. of Dabco is heated at reflux for 3 hours. The solvent is removed on a vacuum evaporator to give methyl 5-methyltricyclo[3.2.2.0$^{2,4}$]-nonane-1-carbamate.

The carbamate is dissolved in 300 ml. of butanol containing 1.0 mole of potassium hydroxide and the solution is heated at reflux overnight. With good cooling the reaction mixture is neutralized with gaseous hydrogen chloride, and then concentrated on a vacuum evaporator. Water is added to the residue, the solution made strongly basic with potassium hydroxide and the product is extracted into methylene chloride. The combined extracts are dried over potassium carbonate and then saturated with dry hydrogen chloride gas. A precipitate is collected by filtration, washed with ether and dried under high vacuum to produce 1-amino-5-methyltricyclo [3.2.2.0$^{2,4}$]nonane hydrochloride.

EXAMPLE 2

α,5-dimethyltricyclo[3.2.2.0$^{2,4}$]nonane-1-methylamine hydrochloride

To a solution of 20.0 g. (0.11 mole) of 5-methyltricyclo[3.2.2.0$^{2,4}$]nonane-1-carboxylic acid (Example 1) in 400 ml. of tetrahydrofuran was added 187 ml. (0.23 mole) of 1.25 M methyl lithium in ether as rapidly as possible under argon with stirring. The reaction mixture was refluxed overnight and, after cooling, 100 ml. of water and 500 ml. of ether were added. The organic layer was separated and the aqueous layer was extracted twice with ether. The combined organic layers were dried over magnesium sulfate and concentrated to give 11.0 g. (56%) of a light yellow oil, 5-methyltricyclo[3.2.2.0$^{2,4}$]nonane-(1) methyl ketone. $\lambda^{liquid} = 1720$ cm.$^{-1}$.

A solution of 7.15 g. (40.2 mmoles) of the ketone and 4.15 g. (59.5 mmoles) of hydroxylamine hydrochloride in a mixture of 25 ml. of ethanol and 3.75 ml. of water was prepared and then 7.5 g. (187 mmoles) of powdered sodium hydroxide was added portionwise with stirring. The reaction mixture was heated at reflux for 5 minutes and then poured onto 150 ml. (300 mmoles) of 2 N aqueous hydrochloride acid. A solid was collected by filtration, washed free of chloride ion with water and dried under high vacuum to produce 7.2 g. (93%) of 5-methyltricyclo[3.2.2.0$^{2,4}$]nonane-(1) methyl ketone oxime as a colorless solid. One recrystallization from ethanol gave an analytical sample, M.P. 167–8°.

*Analysis*—Calcd. for $C_{12}H_{19}NO$: C, 74.6; H, 9.85; N, 7.25. Found: C, 74.47; H, 10.03; N, 7.39.

The NMR spectrum has peaks for cyclopropyl hydrogens. $\lambda^{Nujol} = 3350$ cm.$^{-1}$.

A solution of 4.0 g. (20.7 mmoles) of 5-methyltricyclo[3.2.2.0$^{2,4}$]nonane-(1) methyl ketone oxime in 40 ml. of ethanol was heated to reflux and 5.2 g. (226 mmoles) of sodium chips were added portionwise at a rate sufficient to maintain reflux (~10 minutes). The reaction mixture was cooled, 40 ml. of water were added and the product was extracted into ether. The combined ether extracts were washed twice with 2 N aqueous sodium hydroxide, dried over potassium hydroxide and then magnesium sulfate, and saturated with dry hydrogen chloride gas.

The solvent was removed on a vacuum evaporator, and to the residue was added 70 ml. (210 mmoles) of 3 N aqueous sodium hydroxide. The product was extracted into ether and, after drying as above, the ether was saturated with dry hydrogen chloride gas. A precipitate was collected by filtration, washed with ether and then dried under high vacuum to yield 1.34 g. (30%) of a colorless solid, α,5 - dimethyltricyclo[3.2.2.0$^{2,4}$]nonane - 1-methylamine hydrochloride.

*Analysis*—Calcd. for $C_{12}H_{21}N \cdot HCl$: C, 66.8; H, 10.2; N, 6.48; Cl, 16.45. Found: C, 66.39; H, 10.42; N, 6.50; Cl, 16.43.

The NMR (δ) has peaks at 4.8 (singlet, 3H), —NH$_3^+$; 3.3 (doublet, 1H) —CH— adjacent to N; 1.7 to 0.4 (multiplet, 18H), —CH$_2$—, —CH$_3$ and cyclopropyl hydrogens.

EXAMPLE 3

5-methyltricyclo[3.2.2.0$^{2,4}$]nonane-1-methylamine hydrochloride

To a stirred solution of 3.0 g. (16.7 mmoles) of 5-methyltricyclo[3.2.2.0$^{2,4}$]nonane - 1 - carboxylic acid (Example 1) and 2.71 ml. (1.94 g., 19.4 mmoles) of triethylamine in 70 ml. of chloroform at 0° C. was added 2.0 ml. (2.3 g., 21.3 mmoles) of ethyl chloroformate dropwise over a period of 5 minutes while maintaining a 0° C. temperature with a cooling bath. The reaction mixture was stirred for 30 minutes at 0° C. and then ammonia was bubbled in at 0° C. for 10 minutes. After stirring the reaction for one hour at room temperature, insoluble materials were removed by filtration and the filtrate was concentrated in vacuo to afford 3.33 g. (100%) of 5-methyltricyclo[3.2.2.0$^{2,4}$]nonane - 1 - carboxamide as a colorless solid.

Alternatively, a solution of 0.1 mole of 5-methyltricyclo[3.2.2.0$^{2,4}$]nonane-1-carboxylic acid (Example 1) in 1 mole of thionyl chloride is refluxed for 2 hours, and then is cooled to room temperature. The excess thionyl chloride is removed under vacuum to give 5-methyltricyclo[3.2.2.0$^{2,4}$]nonane-1-carboxylic acid chloride, which is dissolved in 300 ml. of dry chloroform. Ammonia is bubbled into the stirred, cooled (—10°) solution of the acid chloride for 10 minutes, and the solution is then stirred at room temperature for 1 hour. Insoluble ammonium chloride is removed by filtration and the filtrate is concentrated to dryness to give 5-methyltricyclo-[3.2.2.0$^{2,4}$]nonane-1-carboxamide.

The amide (16.7 mmoles) was placed in the cup of a Soxhlet extractor and a suspension of 1.73 g. (45.4 mmoles) of lithium aluminum hydride in 150 ml. of ether was placed in the pot. The ether was heated at reflux overnight and after cooling, excess lithium aluminum hydride was destroyed by the cautious addition of water. The insoluble substances were removed by filtration and the filtrate, after drying over potassium hydroxide and then magnesium sulfate, was saturated with dry hydrogen chloride gas. The precipitate was collected by filtration and washed with ether to yield 2.45 g. (73%) of 5-methyltricyclo[3.2.2.0$^{2,4}$]nonane-1-methylamine hydrochloride as a colorless solid.

*Analysis.*—Calcd. for $C_{11}H_{19}N \cdot HCl$: C, 65.5; H, 9.92; N, 6.95; Cl, 17.6. Found: C, 65.39; H, 10.15; N, 6.80; Cl. 17.65.

The NMR ($\delta$) has peaks at 4.7 (singlet, 3H), —NH$_3^+$; 2.9 (singlet, 2H) —CH$_2$— adjacent to N; 1.7 to 0.3 (multiplet, 15H), —CH$_2$—, —CH$_3$ and cyclopropyl hydrogens.

EXAMPLE 4

$\alpha,\alpha$,5-trimethyltricyclo[3.2.2.0$^{2,4}$]nonane-1-methylamine hydrochloride To a solution of 0.1 mole of 5-methyltricyclo-[3.2.2.0$^{2,4}$]nonane-1-carboxylic acid chloride (Example 3) in 250 ml. of anhydrous ether under an atmosphere of nitrogen is added, dropwise, 0.4 mole of commercial 3 M methylmagnesium bromide at a rate which maintains gentle reflux. The reaction mixture is heated at reflux for 2 hours after the addition, then cooled. To decompose the complex, 250 ml. of saturated aqueous ammonium chloride is added. The ether layer is separated and the aqueous layer is extracted with ether. The combined ether layers are dried with anhydrous magnesium sulfate and are concentrated to give $\alpha,\alpha$,5-trimethyltricyclo[3.2.2.0$^{2,4}$]-1-methanol.

To a solution of 0.1 mole of the alcohol in 0.11 mole of pyridine is added 0.13 mole of thionyl chloride over a period of 50 minutes with cooling. After the addition is completed the reaction mixture is warmed on a steam bath to drive off sulfur dioxide. The reaction mixture is poured onto ice, the product is extracted into methylene chloride and the combined extracts are washed with 10% aqueous sodium carbonate solution. After drying over magnesium sulfate concentration on a rotary evaporator yields $\alpha,\alpha$,5-trimethyltricyclo[3.2.2.0$^{2,4}$]nonane-1-methylchloride.

To 0.2 mole of magnesium in 50 ml. of ether is added a solution of 0.2 mole of $\alpha,\alpha$,5-trimethyltricyclo-[3.2.2.0$^{2,4}$]nonane-1-methylchloride in 100 ml. of ether at such a rate that gentle reflux is maintained. The reaction is cooled to —15° and a solution of 0.1 mole of O-methyl hydroxylamine [Ber., 53, 1477 (1920)] in 15 ml. of ether is added dropwise, the temperature being maintained at —10° to —15° C. After the addition is complete, the temperature is maintained at —10° C. for 30 minutes then allowed to rise slowly to room temperature, and the reaction mixture finally is heated at reflux for 2 hours. The reaction mixture is cooled and acidified with 0.5 mole of 5 N acqueous hydrochloric acid. The aqueous layer is separated and is made strongly basic with 50% aqueous potassium hydroxide. The product is extracted into methylene chloride, which after drying over potassium carbonate is saturated with dry hydrogen chloride gas. Evaporation of the solvent in vacuo gives $\alpha,\alpha$,5-trimethyltricyclo[3.2.2.0$^{2,4}$]nonane - 1 - methylamine hydrochloride.

EXAMPLE 5

1-(N-ethylamino)-5-methyltricyclo[3.2.2.0$^{2,4}$]nonane hydrochloride

A solution of 0.1 mole of 1-amino-5 - methyltricyclo [3.2.2.0$^{2,4}$]nonane (Example 1, prepared by neutralization of the hydrochloride and ether extraction) in 75 ml. of dry pyridine is stirred while 0.10 mole of acetyl chloride is added dropwise at such a rate that the temperature does not exceed 50° C. The mixture is then refluxed for ½ hour, cooled, and poured into 500 ml. of cold water. The resulting precipitate is filtered, washed well with water and is dried to give 1 - acetamido - 5 - methyltricyclo [3.2.2.0$^{2,4}$]nonane.

A 250 ml. flask with reflux condenser, drying tube and stirrer is charged with the acetamide, 100 ml. of diethylene glycol dimethyl ether, and 5.7 g. (0.15 mole) of lithium aluminum hydride. The mixture is heated in an oil bath for 8 hours, at 60° C. and finally for 2 hours at 120° C. After cooling, the reaction mixture is treated with water to decompose the excess lithium aluminum hydride. The insoluble aluminum compounds are dissolved by adding a 20% solution of sodium potassium tartrate. The mixture is extracted with ether, the ether extract is dried with anhydrous potassium carbonate, and concentrated in vacuo. The residue is suspended in 50 ml. of water, taken to pH 2 with concentrated hydrochloric acid, and the resulting solution is extracted with ether to remove any traces of unreacted starting material. The aqueous acidic layer is made strongly basic with sodium hydroxide and the amine is extracted into ether. The ether, after drying over potassium hydroxide and then magnesium sulfate, is saturated with dry hydrogen chloride gas and concentrated on a rotary evaporator to produce 1-(N-ethylamino)-5-methyltricyclo[3.2.2.0$^{2,4}$]nonane hydrochloride.

A flask is charged with 250 ml. of ethanol, 0.30 mole of sodium bicarbonate and 0.1 mole of 1-amino-5-methyltricyclo [3.2.2.0$^{2,4}$]nonane (Example 1, prepared by neutralization of the hydrochloride and ether extraction). Ethyl bromide (0.10 mole) is added and the reaction mixture is then gradually warmed to 65° C., whereupon carbon dioxide is evoled. The mixture is cooled, the solids are removed by filtration and the filtrate is evaporated. The residue is distributed between ether and 10% sodium hydroxide solution. The ether layer is dried with anhydrous potassium carbonate and then treated with dry hydrogen chloride gas. The precipitate is collected by filtration and is washed with ether to afford 1-(N-ethylamino)-5-methyltricyclo[3.2.2.0$^{2,4}$]nonane hydrochloride.

EXAMPLE 6

1-(N,N-dimethylamino)-5-methyltricyclo[3.2.2.0$^{2,4}$] nonane 1-amino-5 - methyltricyclo[3.2.2.0$^{2,4}$]nonane (Example 1, prepared by neutralization of the hydrochloride and ether extraction) (0.1 mole) is heated with 0.50 mole of formic acid and 0.22 mole of formaldehyde on the steam bath for 2 to 4 hours after evolution of gas has ceased. The reaction mixture is cooled and is diluted with 160 ml. (2 moles) 50% aqueous sodium hydroxide. The basic solution is extracted with ether, which after drying over sodium sulfate, is evaporated to yield 1-(N,N-dimethylamino)-5-methyltricyclo[3.2.2.0$^{2,4}$]nonane.

EXAMPLE 7

1-N-ethyl-(N-methylamino)-5-methyltricyclo[3.2.2.0$^{2,4}$] nonane and hydrochloride A reaction is run as described in Example 6 using 0.1 mole of 1-(N-ethylamino) - 5 - methyltricyclo[3.2.2.0$^{2,4}$] nonane (Example 5, prepared by neutralization of the hydrochloride and ether extraction) to give 1-(N-ethyl-N-methylamino)-5-methyltricyclo[3.2.2.0$^{2,4}$]nonane.

1 - (N - ethylamino)-5-methyltricyclo[3.2.2.0$^{2,4}$]nonane (0.1 mole) is refluxed for 19 hours in 50 ml. of butyl formate. The mixture is cooled and excess butyl formate is removed under vacuum and the residue is dried to give 1-N-ethylformamido-5-methyltricyclo[3.2.2.0$^{2,4}$]nonane.

A lithium aluminum hydride reaction is run as described in the second paragraph of Example 5 using the above formamide in place of the acetamide to yield 1-(N-ethyl-N-methylamino)tricyclo[3.2.2.0$^{2,4}$]nonane hydrochloride.

EXAMPLE 8

N-ethyl-N-propyl-5-methyltricyclo[3.2.2.0$^{2,4}$]nonane-1-methylamine hydrochloride A reaction is run as described in the third paragraph of Example 5 using 0.1 mole of 5-methyltricyclo[3.2.2.0$^{2,4}$]nonane-1-methylamine (Example 3, prepared by neutralization of the hydrochloride and ether extraction) and 0.1 mole of propyl bromide to produce N-propyl-5 - methyltricyclo[3.2.2.0$^{2,4}$]nonane-1 - methylamine by evaporation of the ether layer after drying over anhydrous potassium carbonate.

The reaction as described in the third paragraph of Example 5 is run again using N-propyl-5 - methyltricyclo [3.2.2.0$^{2,4}$]nonane-1-methylamine and ethyl bromide to yield N-ethyl-N-propyl-5 - methyltricyclo[3.2.2.0$^{2,4}$]nonane-1-methylamine hydrochloride.

A reaction is run as described in Example 3 except that ethyl propylamine is used in place of ammonia to give 1-N-ethyl - N - propyl-5-methyltricyclo[3.2.2.0$^{2,4}$]nonane-1-methylamine hydrochloride.

A reaction is run as described in the first and second paragraphs of Example 5 using propionyl chloride and 5-methyltricyclo[3.2.2.0$^{2,4}$]nonane - 1 - methylamine (Example 3, prepared by neutralization of the hydrochloride and ether extraction) to afford N-propyl-5-methyltricyclo [3.2.2.0$^{2,4}$]nonane-1-methylamine by evaporation of the final ether extract after drying.

The reaction described in the first and second paragraphs of Example 5 is run again using acetyl chloride and N-propyl - 5 - methyltricyclo[3.2.2.0$^{2,4}$]nonane - 1-methylamine to give N-ethyl-N-propyltricyclo[3.2.2.0$^{2,4}$]nonane-1-methylamine hydrochloride.

EXAMPLE 9

N-allyl- and N,N-diallyl-α,5-dimethyltricyclo-[3.2.2.0$^{2,4}$]nonane-1-methylamine A 2-liter, 4-necked round-bottom flask is equipped with thermometer, dropping funnel, reflux condenser, paddle stirrer and a connection to a gas meter, and charged with 500 ml. of absolute ethanol, 0.60 mole of sodium bicarbonate and 0.20 mole of α,5-dimethyltricyclo[3.2.2.0$^{2,4}$]nonane-1-methylamine (Exampe 2, prepared by neutralization of the hydrochloride and ether extraction). Then 0.3 mole of allyl bromide is added from the dropping funnel. There is no appreciable evolution of carbon dioxide. The mixture is gradually warmed to 65° C., when gas evolution begins. The reaction is allowed to proceed until no more gas is evolved. The mixture is cooled, the solids are filtered, and the filtrate is evaporated. The residue is distributed between ether and 10% sodium hydroxide solution. The ether layer is dried with anhydrous potassium carbonate and evaporated to give an oil. This is distilled at reduced pressure to give two main fractions. The lower-boiling fraction is N-allyl-α,5-dimethyltricyclo-[3.2.2.0$^{2,4}$]nonane-1-methylamine. The higher is N,N-diallyl-α,5-dimethyltricyclo[3.2.2.0$^{2,4}$]nonane - 1 - methylamine.

EXAMPLE 10

1-N-allyl-(N-ethylamino)-5-methyltricyclo-[3.2.2.0$^{2,4}$]nonane hydrochloride

A reaction is run as described in the third paragraph of Example 5 using 0.1 mole of allyl bromide and 0.1 mole of 1 - (N-ethylamino)-5-methyltricyclo[3.2.2.0$^{2,4}$]nonane (Example 5, prepared by neutralization of the hydrochloride and ether extraction) to yield 1-(N-allyl-N-ethyl-amino)-5 - methyltricyclo[3.2.2.0$^{2,4}$]nonane hydrochloride.

EXAMPLE 11

α-ethyltricyclo[3.2.2.0$^{2,4}$]nonane-1-methylamine hydrochloride

A reaction is run as described in the first and second paragraphs of Example 1 using 0.1 mole of ethyl bicyclo[2.2.2]oct-2-ene-1-carboxylate and the same relative molar amounts of reagents to give tricyclo[3.2.2.0$^{2,4}$]nonane-1-carboxylic acid.

The above acid (0.1 mole) is converted to tricyclo-[3.2.2.0$^{2,4}$]nonane-1-carboxylic acid chloride as described in the second paragraph of Example 3.

A solution of diethyl cadmium in benzene is prepared by adding 0.1 mole of powdered anhydrous cadmium chloride over a 5-minute period to 0.2 mole of ethyl magnesium bromide in 100 ml. of anhydrous ether at ice bath temperature. The mixture is heated at reflux with vigorous stirring for 30 minutes. Then, the ether is removed by distillation on a steam bath, and 65 ml. of benzene is added to the nearly dry, brown, pasty residue. Distillation is continued until the vapor temperature of the distillate reaches 61° C. An additional 100 ml. of benzene is added to the diethyl cadmium solution, and the solution is again heated to reflux. Heating is discontinued, vigorous stirring is begun, and a solution of 0.1 mole of tricyclo[3.2.2.0$^{2,4}$]nonane-1-carboxylic acid chloride is added as rapidly as the exothermic reaction will allow. Refluxing and stirring is continued for an additional 45 minutes. The reaction mixture is cooled in an ice bath and 200 g. of water and ice is added, followed by 150 ml. of 20% sulfuric acid. The benzene layer is separated and the aqueous layer is extracted with 75 ml. of benzene. The benzene solutions are combined, dried with anhydrous sodium carbonate, and the benzene is removed by vacuum concentration at 50° to yield a residue of tricyclo[3.2.2.0$^{2,4}$]nonane-(1) ethyl ketone.

The ketone (0.1 mole) is converted to tricyclo-[3.2.2.0$^{2,4}$]nonane-(1) ethyl ketone oxime using the procedure described in the second paragraph of Example 2 and the same relative molar amounts of reagents.

The ketone oxime (0.1 mole) was reduced to give α-ethyltricyclo[3.2.2.0$^{2,4}$]nonane-1-methylamine hydrochloride with sodium in ethanol as described in the third paragraph of Example 2. The same relative molar amounts of reagents were used.

EXAMPLE 12

α-ethyl-α-methyltricyclo[3.2.2.0$^{2,4}$]nonane-1-methylamine hydrochloride

A reaction is run as described in the first paragraph of Example 4, substituting 0.1 mole of tricyclo[3.2.2.0$^{2,4}$]nonane-(1) ethyl ketone (Example 11) for the acid chloride to give α-ethyl-α-methyltricyclo[3.2.2.0$^{2,4}$]nonane-1-methanol.

The alcohol (0.1 mole) is converted to α-ethyl-α- methyltricyclo[3.2.2.0$^{2,4}$]nonane-1-methylamine hydrochloride by the procedure described in the second and third paragraphs of Example 4.

EXAMPLE 13

α,5-dimethyltricyclo[3.2.2.0$^{2,4}$]nonane-1-methylamine citrate

A mixture of 0.1 mole of α,5-dimethyltricyclo-[3.2.2.0$^{2,4}$]nonane-1-methylamine (Example 2, prepared by neutralization of the hydrochloride and ether extraction) and 0.1 mole of citric acid in 100 ml. of water is concentrated in a vacuum at 60° C. The resulting salt, α,5-dimethyltricyclo[3.2.2.0$^{2,4}$]nonane-1-methylamine citrate, is dried under vacuum.

EXAMPLE 14

1-amino-5-methyltricyclo[3.2.2.0$^{2,4}$]nonane pamoate

A solution of 5-methyl-1-aminotricyclo[3.2.2.0$^{2,4}$]nonane hydrochloride (Example 1) in 50 ml. of water is added to a solution of 0.05 mole of pamoic acid, disodium salt [4,4′-methylene-bis(3-hydroxy-2-naphthoic acid), disodium salt] in 250 ml. of water. The resulting precipitate is collected, filtered, washed well with water, and is dried in a vacuum to give 1-amino-5-methyltricyclo[2.2.2.0$^{2,4}$] nonane pamoate.

EXAMPLE 15

5-methyltricyclo[3.2.2.0$^{2,4}$]nonane-1-methylamine maleate

A mixture of 0.1 mole of 5-methyltricyclo[3.2.2.0$^{2,4}$]nonane-1-methylamine (Example 3, neutralization of the hydrochloride and extraction into ether) and 0.05 mole of maleic acid in 100 ml. of water is concentrated in vacuo. The resulting salt, 5-methyltricyclo[3.2.2.0$^{2,4}$]nonane-1-methylamine maleate, is dried in vacuo at 60° C.

The preceding examples can be repeated substituting equivalent amounts of appropriate starting materials to obtain other compounds of this invention including those listed hereinbefore.

The compounds of Formula 1 above can be administered to a warm-blooded animal in the antiviral treatment according to this invention by any means that effects contact of the active ingredient compound with the site of virus infection in the body. It will be understood that this includes the site prior to infection setting in as well as after. For example, administration can be parenterally, that is subcutaneously, intravenously, intramuscularly, or intraperitonelly. Alternatively or concurrently, the compounds are effective on administration by the oral route. Since they are particularly effective against respiratory infections such as viral influenza and viral pneumonia, administration can be by vapor or spray through the mouth or nasal passages.

The compounds within the scope of this invention are valuable for viral prophylaxxis, as well as for therapeutic treatment.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 0.1 to 25 milligrams per kilogram of body weight, although lower, such as 0.5 milligram per kilogram, or higher amounts can be used. Ordinarily, from 0.25 to 15 and preferably 0.5 to 10 milligrams per kilogram per day, in one or more applications per day, is effective to obtain the desired result.

The active ingredient of Formula 1 can be employed in useful compositions according to the present invention in such dosage forms as tablets, capsules, powder packets, or liquid solutions, suspensions, or elixirs, for oral administration or liquid solutions for parenteral use, and in certain cases suspensions for parenteral use (except intravenous). In such compositions the active ingredient will ordinarily always be present in an amount of at least 0.5% by weight based on the total weight of the composition and not more than 90% by weight.

Besides the active ingredient of Formula 1 the antiviral composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of Formula 1 and 70–40% of a carrier. In another embodiment, the active ingredient is tableted with or without adjuvants. In yet another embodiment, the active ingredient is put into powder packets and employed. The active ingredient of the capsules, tablets and powders will generally constitute from about 5% to 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectable solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10% and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, as well known reference text in this field.

In addition to the exemplary illustrations above, the following examples further explain the present invention:

EXAMPLE 16

A large number of unit capsules are prepared by filling standard two-piece hard gelatin capsules weighing about 50 milligrams each with 50 milligrams of powdered α,5-dimethyltrilyllo[3.2.2.0$^{2,4}$]nonane - 1 - methylamine hydrochloride, 125 milligrams of lactose and 1 milligram of "Cab-o-sil."

EXAMPLE 17

Example 16 is repeated except that soft gelatin capsules are used and powdered α,5-dimethyltricyclo[3.2.2.0$^{2,4}$]-nonane-1-methylamine (free base) is first dissolved in mineral oil.

EXAMPLE 18

Example 16 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

EXAMPLE 19

A parenteral composition suitable for administration by injection is prepared by stirring 5% by weight of the active ingredient of Example 16 in sterile aqueous 0.9% saline.

The invention claimed is:

1. A compound selected from the group consisting of
(a) compounds of the formula

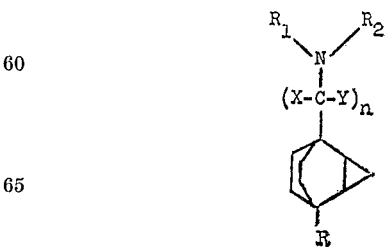

where
$R_1$ and $R_2$ are each selected from the group consisting of hydrogen, alkyl of 1 to 4 carbon atoms and allyl;
X and Y are each selected from the group consisting of hydrogen, methyl, and ethyl;

R is selected from the group consisting of hydrogen, and alkyl of 1 to 4 carbon atoms;
n is an integer of 0 to 1; and
(b) non-toxic acid addition salts of the compounds of (a) above.

2. α,5 - dimethyltricyclo[3.2.2.0$^{2,4}$]nonane - 1 - methylamine hydrochloride.

3. 1 - amino - 5 - methyltricyclo[3.2.2.0$^{2,4}$]nonane hydrochloride.

4. α,α,5 - trimethyltricyclo[3.2.2.0$^{2,4}$]nonane - 1 - methylamine hydrochloride.

5. α - Methyltricyclo[3.2.2.0$^{2,4}$]nonane - 1 - methylamine hydrochloride.

6. 1 - amino-5-ethyltricyclo[3.2.2.0$^{2,4}$]nonane hydrochloride.

7. α,N,5 - trimethyltricyclo[3.2.2.0$^{2,4}$]nonane - 1-methylamine hydrochloride.

No references cited.

CHARLES B. PARKER, *Primary Examiner*.

P. C. IVES, *Assistant Examiner*.

U.S. Cl. X.R.

260—239.1, 453, 468, 501.1, 501.12, 514, 544, 546, 557, 561, 566, 586, 617, 648, 665; 424—330